United States Patent [19]

Jäger

[11] Patent Number: 4,849,139

[45] Date of Patent: Jul. 18, 1989

[54] DEVICE FOR AERATING WATER

[75] Inventor: Andreas Jäger, Burgdorf, Fed. Rep. of Germany

[73] Assignee: Arnold Jäger, Burgdorf, Fed. Rep. of Germany

[21] Appl. No.: 173,448

[22] Filed: Mar. 25, 1988

[30] Foreign Application Priority Data

Mar. 26, 1987 [DE] Fed. Rep. of Germany ....... 3709910

[51] Int. Cl.$^4$ ............................................... B01F 3/04
[52] U.S. Cl. ........................................................ 261/122
[58] Field of Search ................. 160/380, 182; 261/122

[56] References Cited

U.S. PATENT DOCUMENTS

| | | | |
|---|---|---|---|
| 1,216,495 | 2/1917 | Reese | 160/380 |
| 1,247,540 | 11/1917 | Jones | 261/122 |
| 1,731,779 | 10/1929 | Houston | 261/122 |
| 1,792,286 | 2/1931 | Curry et al. | 261/122 |
| 1,873,843 | 8/1932 | MacDonald | 261/122 |
| 1,994,205 | 3/1935 | Yalch | 160/182 |
| 2,659,582 | 11/1953 | Sandor | 261/122 |
| 4,631,134 | 12/1986 | Schussler | 261/122 |

FOREIGN PATENT DOCUMENTS

| | | | |
|---|---|---|---|
| 51889 | 12/1932 | Norway | 261/122 |
| 397841 | 8/1933 | United Kingdom | 261/122 |
| 712170 | 7/1954 | United Kingdom | 261/122 |

Primary Examiner—Tim Miles
Attorney, Agent, or Firm—Becker & Becker, Inc.

[57] ABSTRACT

A device for aerating water, and including a rigid, essentially planar support member, and thereupon a plate of elastomeric material that is provided with fine slits for the release of air. The underside of the support member is provided with one or more connectors for supplying air between the support member and the plate. The rim of the plate is pressed in an airtight manner from above against the support member by a profiled annular frame that is secured by screws to the support member. The frame has a flat portion via which it rests against the plate, and also has an annular reinforcing rib that is directed upwardly away from the plate, so that the frame has an L-shaped or T-shaped cross-sectional shape. The frame also has an outer peripheral portion for receiving fastening screws.

10 Claims, 2 Drawing Sheets

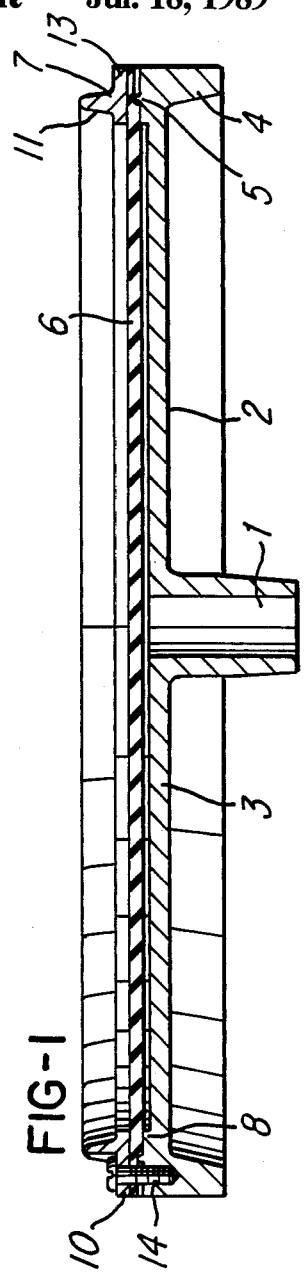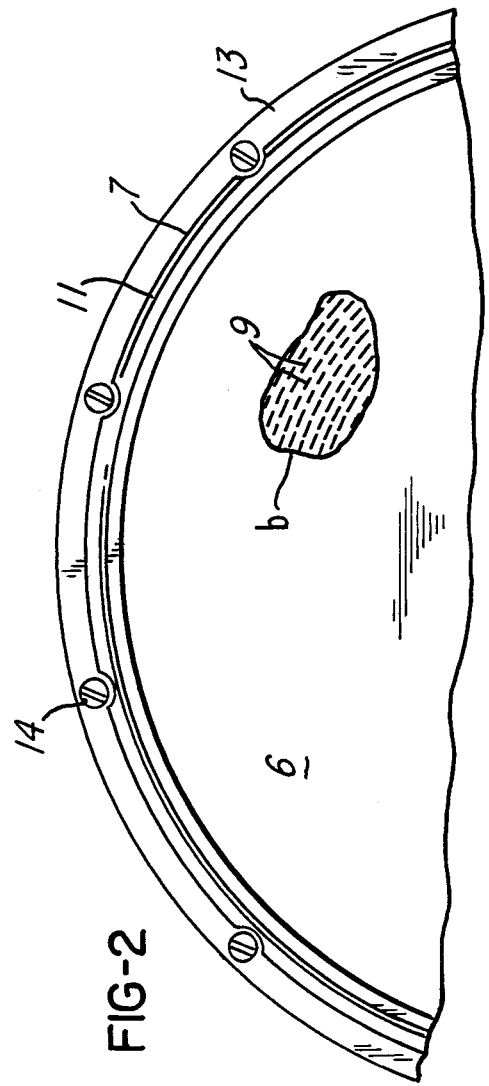

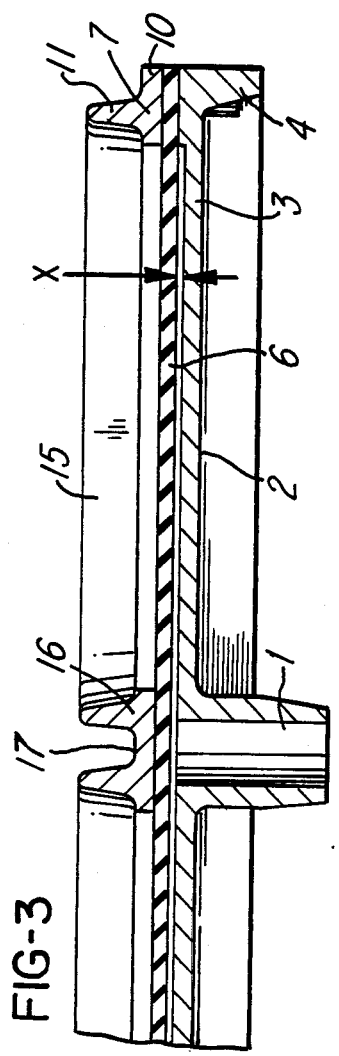
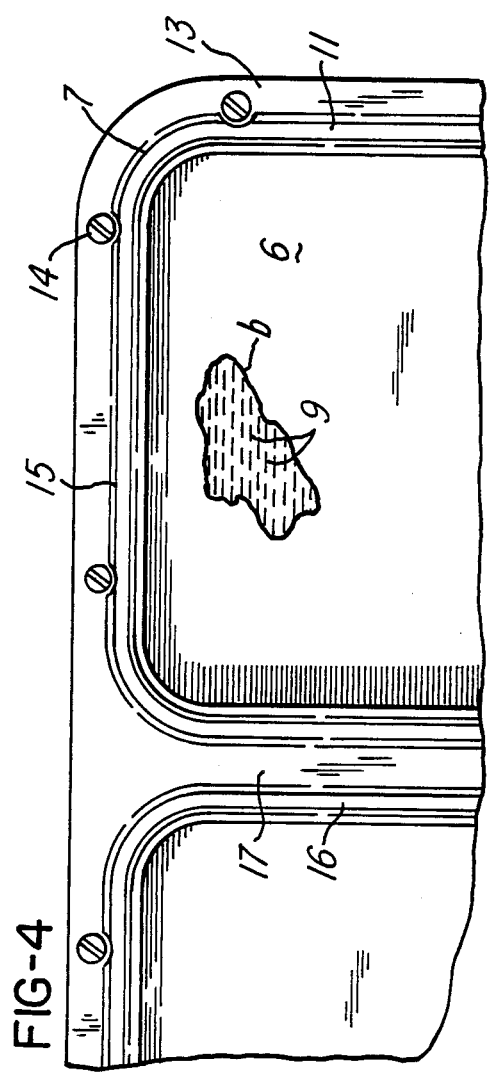

DEVICE FOR AERATING WATER

BACKGROUND OF THE INVENTION

The present invention relates to a device for aerating water, especially during purification of water and for waste water. The device includes a rigid, essentially planar support member, and a plate of elastomeric material, such as rubber or rubber-like synthetic material. The plate is disposed on the support member and is provided with fine slits for the release of air. The support member is provided on its underside, remote from the plate, with one or more connectors for supplying air between the support member and the plate. The rim of the plate is pressed in an airtight manner from above against the support member by a profiled annular frame that is secured via screws or the like to the support member. The operational portions of the device are adapted to be disposed essentially horizontally in the water.

It is an object of the present invention to achieve a good, durable pressing of the plate against the support member, and hence an absolutely airtight connection, with little use of material.

BRIEF DESCRIPTION OF THE DRAWINGS

This object, and other objects and advantages of the present invention, will appear more clearly from the following specification in conjunction with the accompanying schematic drawings, in which:

FIG. 1 is a vertical cross-sectional view through one exemplary embodiment of the inventive aerating device, which is in the form of a platelike water aerator;

FIG. 2 is a partial plan view of the aerating device of FIG. 1;

FIG. 3 is a vertical cross-sectional view through part of a second exemplary embodiment of the inventive aerating device, which has a rectangular or square contour and rounded corners; and FIG. 4 is a partial plan view of the aerating device of FIG. 3.

SUMMARY OF THE INVENTION

The aerating device of the present invention is characterized primarily in that the frame has a flat portion via which it rests against the plate, and also has an annular reinforcing rib that is directed upwardly away from the plate, so that the frame has an L-shaped or T-shaped cross-sectional shape, with the frame also having an outer peripheral portion for receiving fastening screws.

The reinforcing rib of the frame is preferably disposed on the inner rim thereof, so that the fastening screws can be provided on the outer portion of the frame. For devices that are expected to encounter a great deal of stress, it would also be possible to provide two parallel reinforcing ribs for the frame, in which case the fastening screws are preferably disposed between the two parallel ribs.

It is furthermore advantageous, where the frame has an L shape, with screws provided on the outer periphery of the frame, to provide the rim of the support member, which is disposed on the underside of the device, with downwardly extending, annular reinforcing ribs that are expediently disposed in such a way that they are disposed practically below the screw holes for the fastening screws. This provides the possibility for a very good anchoring of the screws, because the latter can then be fixed to the reinforcing ribs, or at least in the vicinity of these ribs.

For aerating devices that have a large surface area, and especially devices that have a square or rectangular contour, it is advantageous to dispose over the slit plate profiled members that extend transversely over this plate, with the ends of these profiled members being connected to rim portions of the frame. These profiled members can have an L-shaped, T-shaped, or U-shaped crosssectional shape. The profiled members, which are advantageously rigid, are intended to prevent the plate from bulging too much. The profiled members can merge integrally into the rim portions of the frame.

Further specific features of the present invention will be described in detail subsequently.

DESCRIPTION OF PREFERRED EMBODIMENTS

Referring now to the drawings in detail, the aerating device of FIGS. 1 and 2, which has a round contour, is to be disposed horizontally in the water, as is the aerating device of FIGS. 3 and 4. The aerating device is supplied via a line that is connected at the bottom of the aerating device to a centrally disposed connector 1. This connector is part of a rigid molded plastic element that forms a support member 2. This support member comprises a thin-walled main body 3, the rim of which is reinforced by a downwardly directed rib 4 that forms an annular structure. Thus, the inventive aerating device can have an adequate rigidity although it is thin and has little buoyancy. On the upper side, the rim of the support member 2 is slightly raised and is provided with a jagged, annular projection 5. Disposed in this region, which is approximately 10 mm wide, is the rim of a plate 6 of rubber or similar elastomeric material. The plate 6 is pressed against the raised rim portion 8 of the support member 2 via a plastic ring that is in the form of an annular frame 7.

In the non clamped-in central portion, the plate 6, with the exception of its center above the connector 1, is provided with a plurality of fine slits 9 that extend all the way through. These fine slits 9 spread from within under the effect of air pressure, release air bubbles into the water, and again close after the air pressure has been reduced. In order to simplify illustration, the slits 9 have been indicated only in the region designated by the reference symbol "b".

The important thing is the clamping and securing of the plate 6 by the frame 7, which on the whole has an approximately L-shaped cross-sectional shape. One portion 10 of this cross section rests flat upon the rim of the plate 6, while a rib 11, which is disposed in the region of the inner periphery of the frame 7, is directed perpendicularly upwardly. The flat portion 13 that is disposed on the outer periphery of the frame 7 and is part of the portion 10 is disposed above, and in the projection of, the reinforcing rib 4. The flat portion 13 serves to receive screws 14 that extend through the frame 7, the plate 6, and finally a significant portion of the cross section on the reinforcing rib 4, so that the screws 14 are anchored very securely. It should be noted that the rib 11 is also disposed above the pointed projection 5 in order in this manner to bring about a suitable pressure of the plate 6 against the support member 2.

In the embodiment illustrated in FIGS. 3 and 4, a circumferential frame 7 having a rib 11 disposed toward the inside, and outwardly thereof a flat portion 13 for receiving screws 14, is again provided. The important thing with this modified contour is that in order to prevent free deformation of the plate 6 over the length of the device, opposite sides 15 of the frame 7 are connected by a rigid profiled member 16 that integrally merges into the sides 15. The profiled member 16 has an approximately U-shaped cross-sectional shape, with the connecting portion 17 resting flat upon the plate 6. Where the profiled member 16 is centrally arranged, two or more connectors 1 are disposed below the profiled member 16. Again with this embodiment, for the sake of simplicity, the fine slits 9 are illustrated by way of example only in the portion designated by the reference symbol "b".

A view of the cross section of the rim portion of the inventive device shows that the upper rib 11 is offset radially inwardly, in contrast to the reinforcing rib 4 that is disposed radially outwardly. In this way, while providing a good reinforcement for the frame 7, a favorable opportunity is provided for securing the plurality of screws 14.

The present invention is, of course, in no way restricted to the specific disclosure of the specification and drawings, but also encompasses any modifications within the scope of the appended claims.

What I claim is:

1. In a device for aerating water, with said device including a rigid, essentially planar support member and a plate of elastomeric material, such as rubber or rubber-like synthetic material, with said plate being disposed on said support member and being provided with fine slits for the release of air, whereby said support member is provided on its underside, remote from said plate, with one or more connectors for receiving air and supplying same between said support member and said plate, and whereby the rim of said plate is pressed in an airtight manner from above against said support member by a profiled annular frame that is secured via fastening screws to said support member, with the operational portions of said device being adapted to be disposed essentially horizontally in said water, the improvement therewith wherein:

said annular frame has a flat portion via which said annular frame rests against said plate, and also has an annular reinforcing rib that is directed away from said plate so that said frame has a predetermined cross-sectional shape; said frame also has an outer peripheral portion that is flat for receiving said fastening screws;

said support member being thin-walled and having a rim, in the vicinity of said frame, that is also provided with reinforcing rib means that are located on the outer peripheral portion and that extend away from said plate in a direction opposite to said reinforcing rib of said frame; and said reinforcing rib of said frame and said reinforcing rib means of said support member being displaced and not aligned with respect to one another, with said reinforcing rib of said frame being disposed closer to a central portion of said device than is said reinforcing rib means of said support member, whereby said fastening screws engage at least partially in said reinforcing rib means.

2. A device according to claim 1, in which said support member, in the vicinity of said frame, is provided with at least one jagged projection, which is adapted to engage said plate.

3. A device according to claim 2, in which said at least one jagged projection is an annular projection disposed below said reinforcing rib of said frame.

4. A device according to claim 1, in which said frame has two parallel, spaced-part annular reinforcing ribs that are interconnected by a crosspiece that rests upon said plate, with said fastening screws extending through said crosspiece.

5. A device according to claim 1, in which said support member, in the vicinity of said frame, has a rim portion that, relative to a central portion thereof, is raised slightly in a direction toward said plate and said frame.

6. A device according to claim 1, which has an essentially quadratic contour, including two opposite sides for said frame; and in which said frame includes at least one flexurally stiff profiled member that rests upon said plate and interconnects said opposite sides.

7. A device according to claim 6, in which said at least one profiled member has an L-shaped, T-shaped, or U-shaped cross-sectional shape.

8. A device according to claim 7, in which said frame is provided with a single reinforcing rib, and said at least one profiled member is U-shaped.

9. A device according to claim 6, in which said one or more connectors are disposed spaced below said at least one profiled member.

10. A device according to claim 9, which includes two connectors.

* * * * *